United States Patent
Roes et al.

(10) Patent No.: US 7,681,526 B2
(45) Date of Patent: Mar. 23, 2010

(54) WATERING DEVICE FOR POULTRY

(75) Inventors: Christopher Richard Roes, Cromwell, IN (US); Susan S. Hight, Warsaw, IN (US); Lionel L. Kreger, Warsaw, IN (US)

(73) Assignee: CTB, Inc., Milford, IN (US)

( * ) Notice: Subject to any disclaimer, the term of this patent is extended or adjusted under 35 U.S.C. 154(b) by 0 days.

(21) Appl. No.: 11/779,672

(22) Filed: Jul. 18, 2007

(65) Prior Publication Data

US 2008/0156271 A1 Jul. 3, 2008

Related U.S. Application Data

(60) Provisional application No. 60/833,090, filed on Jul. 25, 2006.

(51) Int. Cl.
*A01K 7/00* (2006.01)

(52) U.S. Cl. .......................... 119/72.5; 119/74

(58) Field of Classification Search .............. 119/70, 119/52.2, 72.5, 74, 81, 69.5, 53; D30/123; D7/359
See application file for complete search history.

(56) References Cited

U.S. PATENT DOCUMENTS

| | | | |
|---|---|---|---|
| D123,236 S | 10/1940 | Perlmutter | |
| D188,655 S * | 8/1960 | Blough | D30/131 |
| 3,092,078 A | 6/1963 | Goswick | |
| D201,670 S | 7/1965 | Moore | |
| D205,536 S | 8/1966 | Griese, Jr. | |
| 3,509,813 A * | 5/1970 | Appelt | 99/432 |
| 3,648,663 A | 3/1972 | Kofford | |
| D263,915 S | 4/1982 | Kohan | |
| 5,154,138 A | 10/1992 | Siddiqui et al. | |
| 5,293,836 A | 3/1994 | Hostetler | |
| D356,010 S | 3/1995 | McEntee | |
| 5,456,210 A | 10/1995 | Miller | |
| 5,660,139 A * | 8/1997 | Hostetler | 119/72.5 |
| 5,881,675 A * | 3/1999 | Shaffer | 119/430 |
| D444,676 S | 7/2001 | Murphy | |
| 6,349,672 B1 | 2/2002 | Daffi | |

(Continued)

OTHER PUBLICATIONS

"Big Z Activator" brochure; Two (2) pages by Ziggity Systems Inc; Copyright 2003.

(Continued)

*Primary Examiner*—Michael R Mansen
*Assistant Examiner*—Monica L Williams
(74) *Attorney, Agent, or Firm*—Trexler, Bushnell, Giangiorgi, Blackstone & Marr, Ltd.

(57) ABSTRACT

A watering disc for use in a nipple assembly of a watering line system has an outer rim portion and an upper surface extending inwardly from said outer rim portion to an aperture provided through a center of the watering disc. The upper surface defines a plurality of separators and a plurality of individual compartments in an alternating manner about a circumference of the watering disc. The plurality of separators generally extend from proximate the center of the watering disc to the outer rim portion in order to define each individual compartment between the outer rim portion and two adjacent separators. Each individual compartment is substantially formed in a concave manner and are configured to receive and retain water from the watering line system. The watering disc is formed of plastic and has reflective particles integrally formed therein for attracting poultry to the watering disc.

23 Claims, 8 Drawing Sheets

U.S. PATENT DOCUMENTS

| | | |
|---|---|---|
| 6,571,732 B2 * | 6/2003 | Hight et al. ................. 119/52.1 |
| D478,246 S | 8/2003 | Villano et al. |
| D478,247 S | 8/2003 | Henry et al. |
| D478,248 S * | 8/2003 | Villano et al. ................. D7/359 |
| D492,540 S | 7/2004 | Henry et al. |
| 2,590,266 A1 | 9/2007 | Nelson |
| 2001/0003341 A1 * | 6/2001 | Gentry et al. ............... 220/574 |

OTHER PUBLICATIONS

"Big Z Activator Management Procedures Turkey Poult Applications" brochure; Two (2) pages by Ziggity Systems Inc.; Copyright 2000.

* cited by examiner

WATERING DEVICE FOR POULTRY

CROSS-REFERENCE AND INCORPORATION BY REFERENCE

This patent application claims the benefit of domestic priority of U.S. Provisional Application Ser. No. 60/833,090, filed Jul. 25, 2006, and entitled "Watering Device For Poultry". U.S. Provisional Application Ser. No. 60/833,090 is hereby incorporated by reference.

FIELD OF THE INVENTION

The present invention generally relates to nipple or trigger pin for poultry watering devices. More specifically, the present invention relates to an improved disc to be secured to a trigger pin for retaining water thereon for use in poultry watering devices.

BACKGROUND OF THE INVENTION

Trigger pin watering devices are commonly used for delivering water to poultry in poultry houses. Such drinkers generally include a chamber through which the water flows. One end of the chamber is adapted to be fitted to a water supply line and includes an inlet for allowing water to pass from the supply line into the chamber. The other end of the chamber generally includes an opening to allow fluid to flow out of the chamber. A valve seat and valve member are normally disposed within the chamber to prevent water from flowing out when the drinker is not being actuated by a bird. A valve actuating member is normally housed partially within the chamber and extends through the chamber outlet. The valve actuating member normally includes a cylindrical trigger pin, which the bird pecks or lifts, thereby unseating the valve member from the valve seat and allowing water to flow through the chamber and out to the bird. When actuation ceases, the valve member returns to the valve seat, thereby shutting off the water flow.

In many instances, a drop of water will remain hanging from the end of the pin after the bird has finished drinking. Similarly, a drop of water may also collect on the pin if the drinker leaks. The residual drop of water on the pin serves a useful function in that it attracts birds to the drinkers. When a thirsty bird sees the residual drop of water on the pin, it knows that it should go to the drinker to get water. However, it may also happen that the residual drop of water is so large that it eventually falls from the pin onto the floor of the poultry house. Additionally, if the watering system is vibrated, such as when a bird bumps into it, the droplet may fall from the pin. Furthermore, if a large or strong bird pecks at the pin forcefully, the water drop may fly off the pin on the side opposite the bird. Accordingly, the bird does not receive any water and the floor of the poultry house does. Aside from the fact that the poultry do not receive as much water under these circumstances, the health of the poultry is also threatened by the increased wetting of the manure on the floor of the poultry house. The wetter the manure is, the easier it is for bacteria and disease to breed in the poultry house.

In order to combat the foregoing, different "disc" designs have been provided to be secured to the trigger pin in order to retain water on the disc such that the birds can drink the retained water and such that spillage of the water onto the floor of the poultry house is lessened or minimized.

One such prior art "disc" design is described and illustrated in U.S. Pat. No. 5,154,138. The '138 patent discloses a "disc" or enlarged body having an extension and a knob. The trigger pin is secured within the extension. The knob depends from the extension at a lower end thereof and has an upper horizontal surface and a lower rounded surface. Upon actuation, water flows down the trigger pin, down the extension and onto the upper surface of the knob such that a quantity of water is held thereon by cohesive forces and natural surface tension. The "disc" of the '138 patent has its limitations, however, primarily that while it has been found to be effective for use in providing water to chickens, it has been found to be ineffective for use in providing water to turkeys. It is believed that the reason for this is that it is not a big enough target (not really any bigger than the trigger pin assembly itself) to attract the turkeys to it and because it does not provide enough water thereon such that the turkeys still need to work hard to get enough water to drink. In view thereof, increased mortality rates have been found when the "disc" of the '138 patent is used in providing water to turkeys.

Another such prior art "disc" design is described and illustrated in U.S. Pat. No. 5,660,139. The '139 patent discloses a "disc" having a sleeve, a collecting surface and a lip. The trigger pin is secured within the sleeve. The collecting surface depends from the sleeve at a lower end thereof and provides an upper horizontal surface. The lip extends upwardly from the outer periphery of the collecting surface. As explained in the '139 patent, upon actuation, the disc will tilt in the direction of the bird such that water on the disc runs across the collecting surface and into the bird's mouth. Additionally, the collecting surface and the lip on the side opposite the bird swing upward when the bird actuates the drinker and act as a retaining wall, thus hindering water from flying off of the back side of the disc, such that the bird receives more water and the floor of the poultry house is kept drier. The '139 patent also describes adding three raised ribs to divide the collecting surface into three discrete compartments. In addition to the foregoing operation, the ribs hold water in the compartments other than the one at which the bird has actuated the disc such that the bird should only receive water from one of the three compartments, thus further reducing the wetting of the poultry and the poultry house floor.

The disc of the '139 patent, however, suffers from a number of disadvantages. Primarily, in actuality, the three ribs and the small perimeter lip provide poor control of the water retention and direction of water movement when triggered/tilted during drinking by the bird. Further, the ribs and the perimeter lip do not really slow the velocity of the water down when the disc is triggered/tilted which is important because if the water comes at the bird too fast it could splash onto the bird, thus preventing the bird from drinking the water, having it spill onto the floor of the poultry house, and possibly spooking the bird such that the bird would not want to drink from the disc again. Also, the disc is fastened to the trigger pin by knurling which does not provide for a high holding strength, which can be important when the disc is used by turkeys.

Another prior art "disc" design is marketed by Ziggity Systems Inc. and is referred to as the "Big Z Activator". The Big Z Activator disc is sold in two sizes that are much larger than the disc sizes of either the '138 patent or the '139 patent, namely of about two and one half inch (2.5") diameter and of about three and three-quarter inch (3.75") diameter. These discs are formed to provide a radial V-shaped trough between the connection of the disc to the trigger pin and the outer periphery of the disc. The actuation of these discs occurs when the bird goes to sip the standing water out of the radial V-shaped trough. The discs are designed such that the bird must push the disc with its neck and rest its neck on the water to drink out of the shape of the trough.

The Big Z Activator disc, however, also suffers from a number of disadvantages. For instance, as the birds get older, they of course become bigger such that a point is reached where the head size on the bird no longer will fit comfortably into the trough and it becomes difficult for the bird to drink out of and, thus, begins to hurt the birds' growth performance. The reason for this is that the birds do not have a full palate, such as humans do, so they cannot technically swallow without compressing water in their mouth and forcing it down their throat. As such, birds typically use a side scooping action (where they obviously need ample room for their heads) where they lay their head over to "push" water down their throat, letting gravity do the work, otherwise the birds prefer drinking from a drinker above their head such that the water flows down their throats by gravity. The Big Z Activator disc thus does not allow the birds to drink in their preferred manner once their head sizes become too large. Also, because the water in the Big Z Activator disc is held in the trough, the birds must get close to it in order to look down into it to see that there is water in it. Thus, the Big Z Activator disc does not make it unmistakably evident to the birds that there is water therein and thus, the water therein does nothing to attract the birds thereto.

Thus, it is desired to provide a disc that is configured to be secured to the trigger pin which retains water thereon such that birds, primarily turkeys, can drink and which reduces spillage of the water onto the floor of the poultry house, but which overcomes or minimizes the disadvantages associated with the prior art "discs".

SUMMARY OF THE INVENTION

Briefly, and in accordance with the foregoing, the invention provides a watering disc for use in a nipple assembly of a watering line system that has an outer rim portion and an upper surface extending inwardly from said outer rim portion to an aperture provided through a center of the watering disc. The upper surface defines a plurality of separators and a plurality of individual compartments in an alternating manner about a circumference of the watering disc. The plurality of separators generally extend from proximate the center of the watering disc to the outer rim portion in order to define each individual compartment between the outer rim portion and two adjacent separators.

Each individual compartment is substantially formed in a concave manner and are configured to receive and retain water from the watering line system. Each individual compartment has a lowermost portion which is generally flat and then curves upwardly in a concave manner from said lowermost portion to said outer rim portion and said two separators defining said individual compartment.

The outer rim portion also curves upwardly and downwardly in an alternating convex and concave manner, with the outer rim portion curving in a convex manner proximate to each of the separators and in a concave manner proximate to each of the individual compartments. Further, the outer rim portion curves inwardly and outwardly relative to the center in an alternating convex and concave manner, with the outer rim portion curving in a concave manner proximate to each of the separators and in a convex manner proximate to each of the individual compartments. The separators are also configured to curve in a convex manner from a connection to one of the individual compartments to the connection of an adjacent individual compartment.

The configuration of the individual compartments, the separators and the outer rim portion are designed to have water retained within the individual compartments bead up higher than the outer rim portion such that the beaded up water is visible to poultry drinking therefrom over the outer rim portion.

The watering disc is also configured to be secured to a trigger pin of a nipple assembly by a snap fit connection to ensure a strong connection therebetween. Catch cups may be provided below the watering discs to catch any excess water than may spill and/or splash off of the watering discs.

The watering disc provides for a number of advantages over prior art watering discs, namely, the watering disc has been found to be successful in providing drinking water for turkeys, birds have their own individual compartments or "space" to drink from, birds will tend to receive water from only the compartment they are drinking from and splashing of water into the faces of the birds will be reduced, which will substantially reduce the wetting of the poultry, the beading of the water will attract the birds to the watering disc, and the watering disc also provides only smooth surfaces for the birds to hit their necks and/or heads and/or bodies against. The catch cups provided below the watering discs in the watering line system also further prevent the spillage or waste of water onto the floor of the poultry house, thus keeping the floor drier.

BRIEF DESCRIPTION OF THE DRAWINGS

The features of the invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which.

DETAILED DESCRIPTION OF THE ILLUSTRATED EMBODIMENT

Figure 1:
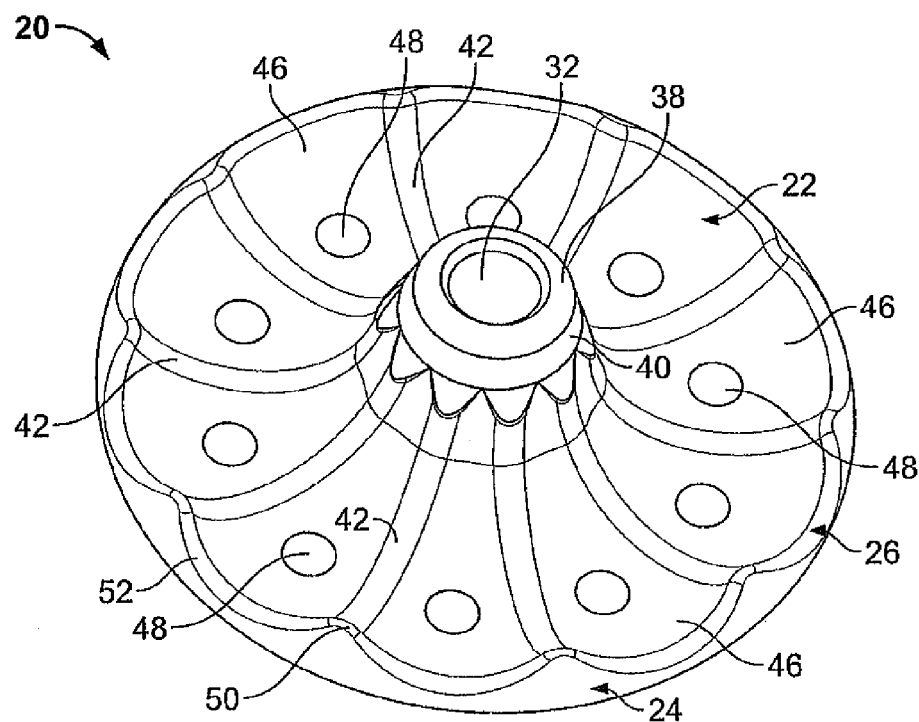
FIG. 1 is a perspective view of a preferred embodiment of the watering disc of the invention.
Figure 3:
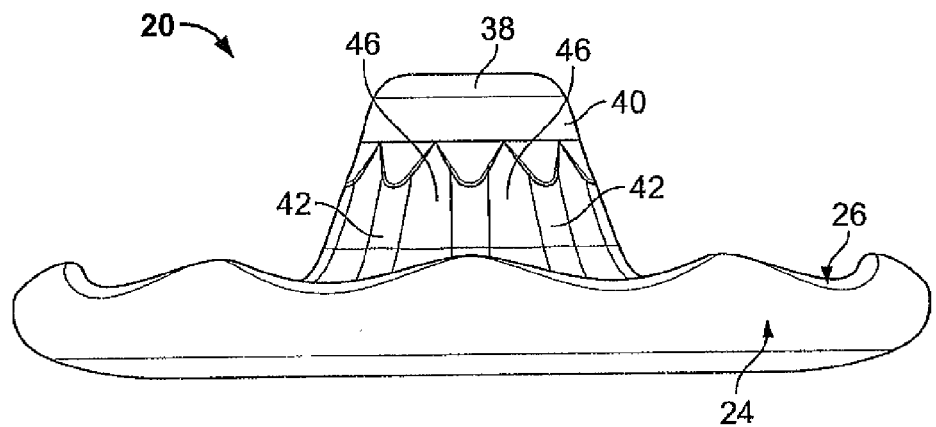
FIG. 3 is a side view of the watering disc.
Figure 2:
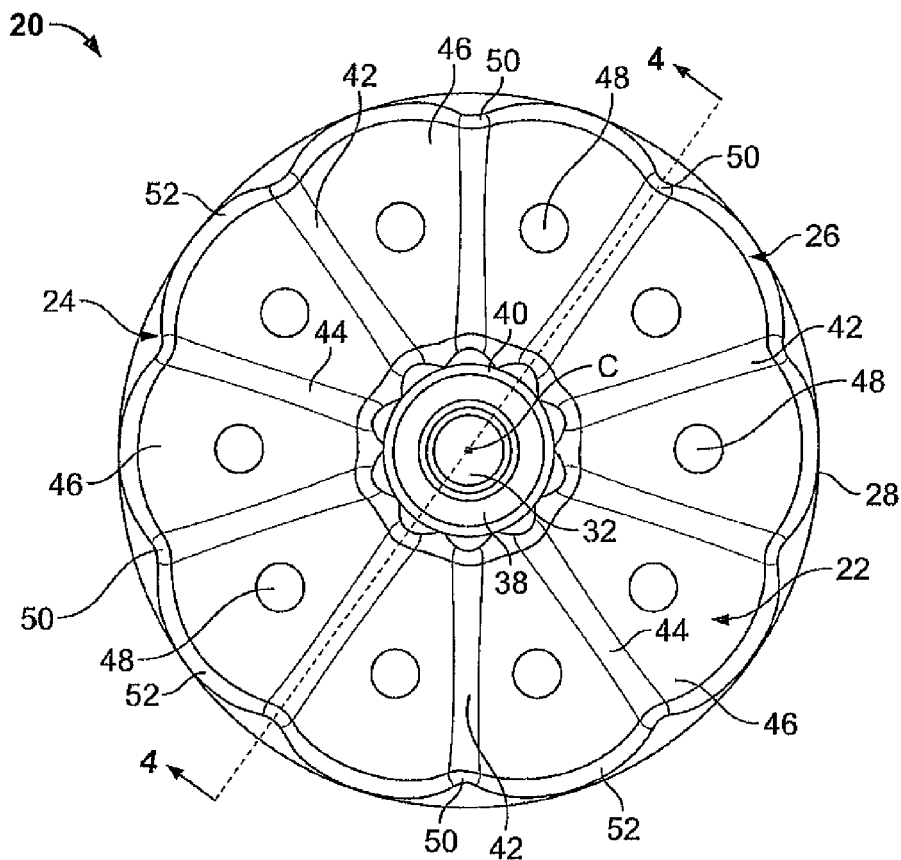
FIG. 2 is a top view of the watering disc.
Figure 4:
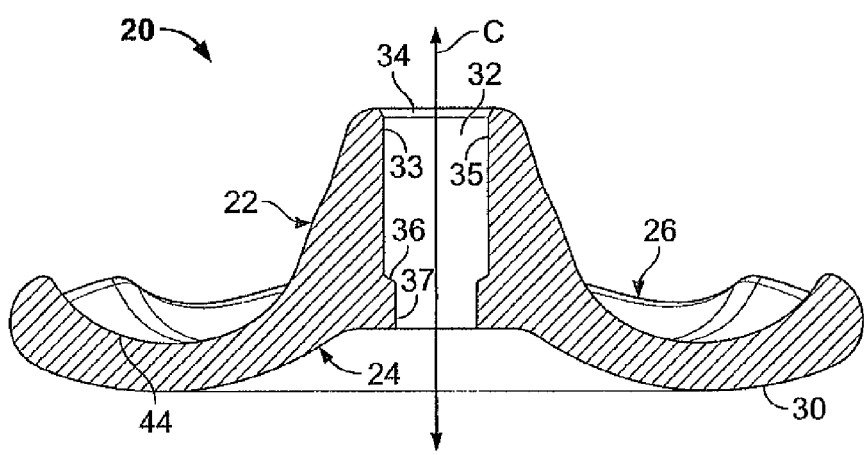
FIG. 4 is a cross-sectional view of the watering disc taken along line 4-4 of FIG. 2.
Figure 5:
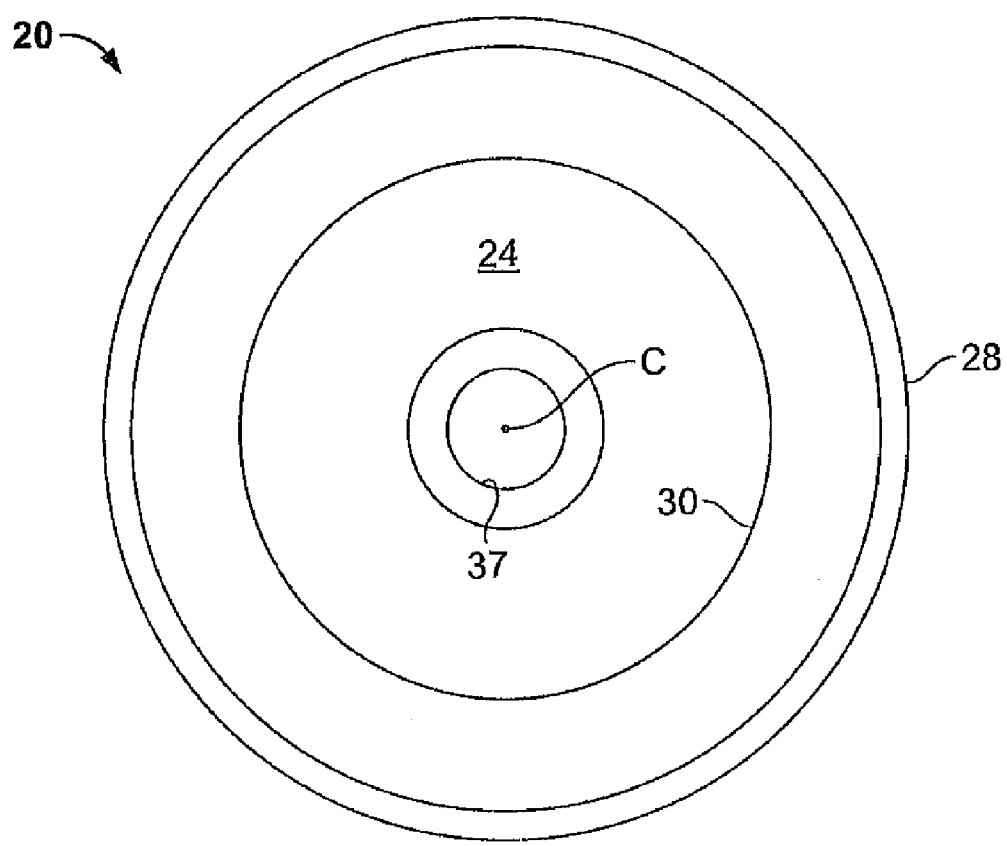
FIG. 5 is a bottom view of the watering disc.
Figure 6:
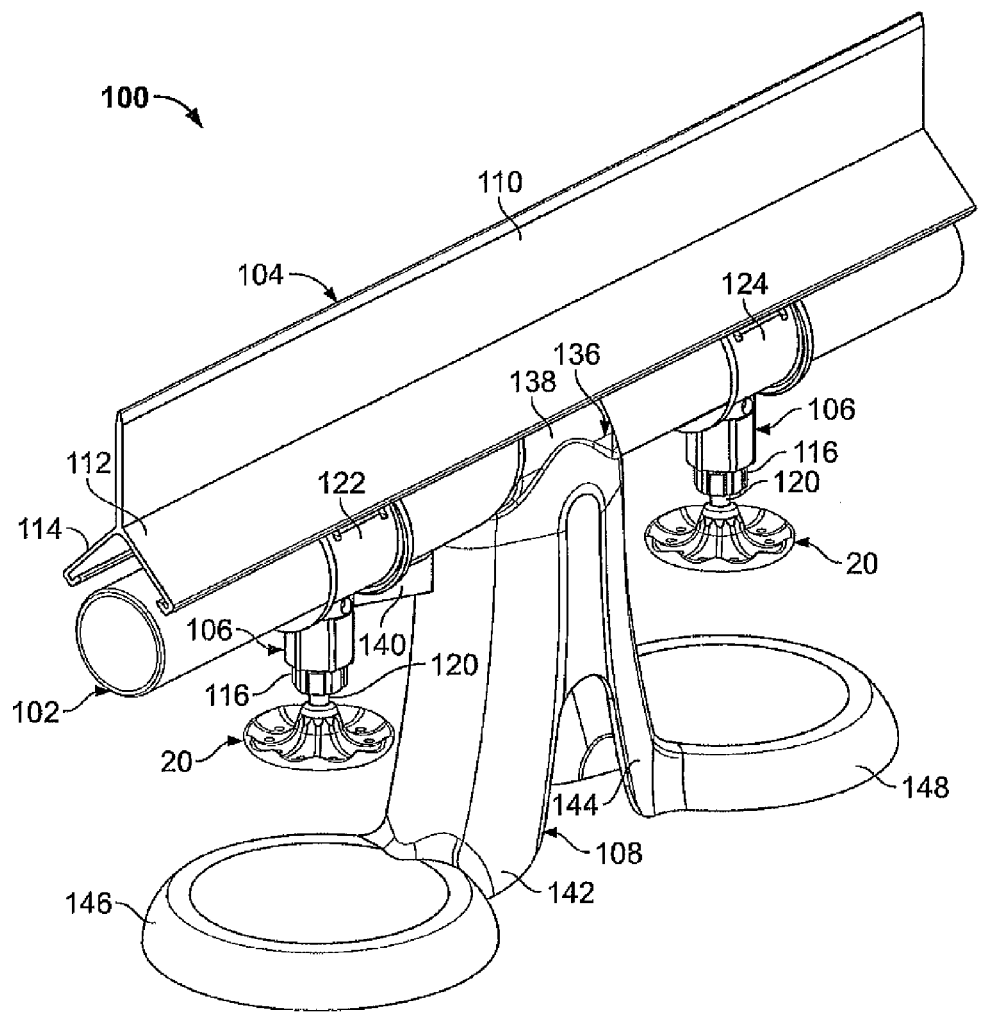
FIG. 6 is a perspective view of a part of a watering line system including two of the watering discs.
Figure 7:
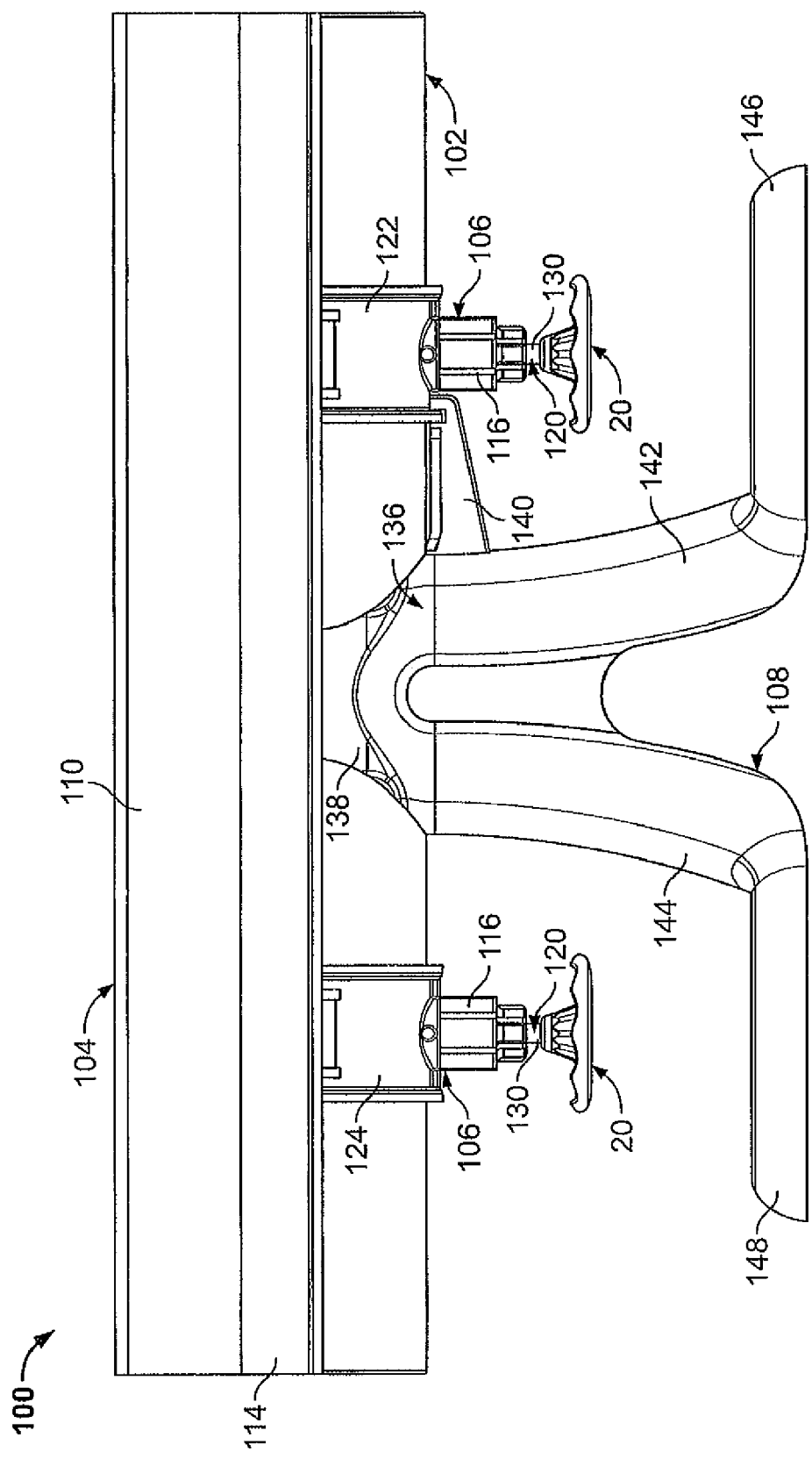
FIG. 7 is a side view of the part of the watering line system.
Figure 8:
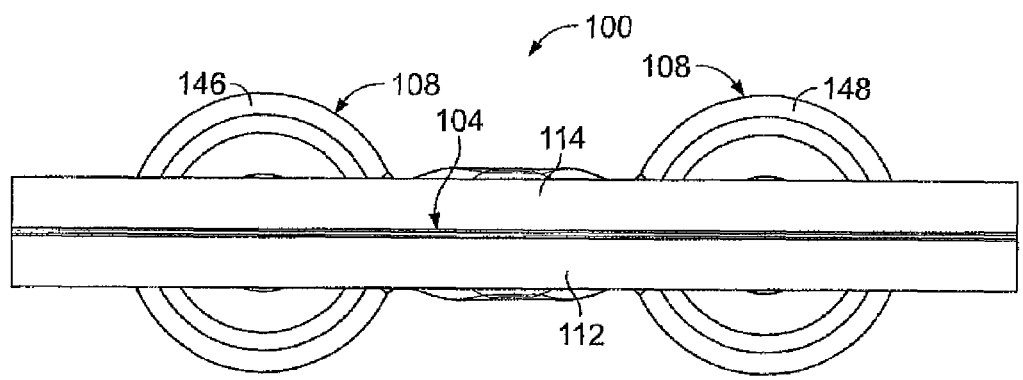
FIG. 8 is a top view of the part of the watering line system.
Figure 9:
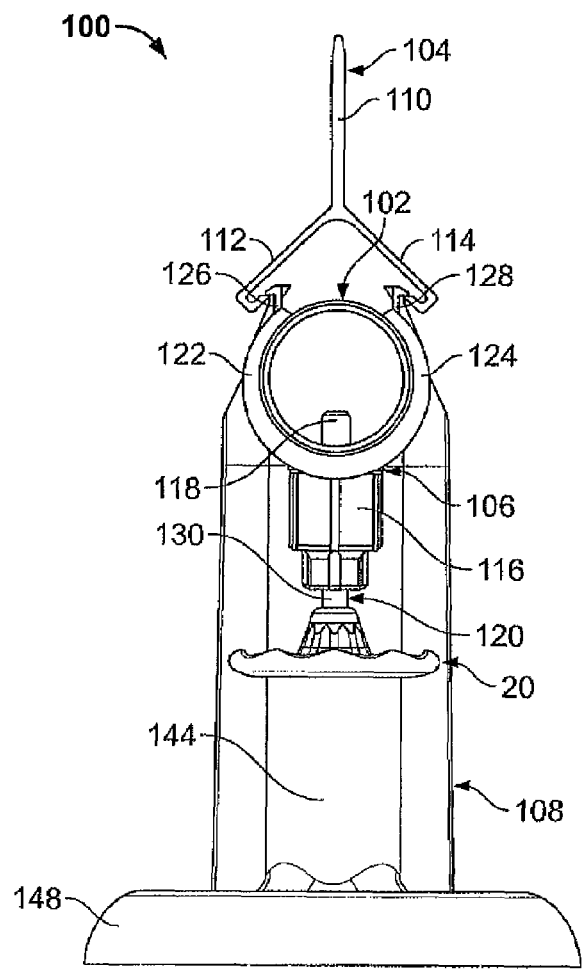
FIG. 9 is a front view of the part of the watering line system.

While this invention may be susceptible to embodiment in different forms, there is shown in the drawings and will be described herein in detail, specific embodiments with the understanding that the present disclosure is to be considered an exemplification of the principles of the invention, and is not intended to limit the invention to that as illustrated and described herein.

FIGS. 1-5 illustrate a disc member 20 used for delivering/ providing liquid, preferably water, to poultry, preferably turkey poults, during the first six (6) to eight (8) weeks of their lives. The disc member 20 has an upper surface 22 and a lower surface 24 which are joined together by a rim portion 26 of the disc member 20. As best illustrated in the bottom view of FIG. 5, the disc member 20 has an outer periphery 28 which is generally circular in configuration and which is defined at a radius about a center C of the disc member 20. In a preferred embodiment of the disc member 20, the radius of the outer periphery 28 is preferably approximately 0.7 inches.

An aperture 32 is provided through the disc member 20 from the upper surface 22 thereof to the lower surface 24 thereof about the center C of the disc member 20. The aperture 32 defines an aperture wall 33. The aperture wall 33 preferably has a length of approximately 0.22 inches from the upper surface 22 to the lower surface 24. The aperture wall 33 preferably has first, second, third and fourth portions 34, 35, 36, 37. The first portion 34 is preferably tapered inwardly and downwardly from the upper surface 22 to the second portion 35 about the center C of the disc member 20. The second portion 35 is generally cylindrical in configuration and is preferably provided at a radius about the center C of the disc member 20. In a preferred embodiment of the disc member 20, the radius of the second portion 35 is preferably approximately 0.0875 inches and preferably has a length of approximately 0.14 inches from the first portion 34 to the third portion 36. The third portion 36 is preferably tapered inwardly and downwardly from the second portion 35 to the fourth portion 37 about the center C of the disc member 20. The fourth portion 37 is generally cylindrical in configuration and is preferably provided at a radius about the center C of the disc member 20. In a preferred embodiment of the disc member 20, the radius of the fourth portion 37 is preferably approximately 0.0575 inches and preferably has a length of approximately 0.06 inches from the third portion 36 to the lower surface 24.

From the aperture 32, the lower surface 24 of the disc member 20 preferably extends straight outwardly relative to the center C of the disc member 20 and then curves downwardly and outwardly to a lowermost portion 30 of the lower surface 24 of the disc member 20. From the lowermost portion 30, the lower surface 24 preferably curves upwardly and outwardly to the outer periphery 28 of the disc member 20. From the outer periphery 28, at least portions of the lower surface 24 preferably curve upwardly and inwardly to the rim portion 26 of the disc member 20.

A first portion 38 of the upper surface 22 preferably curves downwardly and radially outwardly (toward the outer periphery 28), relative to the center C, from the connection of the aperture wall 33 to the upper surface 22. A second portion 40 of the upper surface 22 preferably extends angularly downwardly and radially outwardly (toward the outer periphery 28), relative to the center C, from the first portion 38 of the upper surface 22.

A plurality of like third portions 42 of the upper surface 22 preferably curve and/or angle downwardly and radially outwardly (toward the outer periphery 28), relative to the center C, from the second portion 40 of the upper surface 22 to a lowermost portion 44 of the third portions 42. From the lowermost portion 44 of the third portions 42, the third portions 42 preferably curve upwardly and radially outwardly (toward the outer periphery 28), relative to the center C, to the rim portion 26 of the disc member 20. Each of the third portions 42 maintain a generally constant width about their lengths from the second portion 40 of the upper surface 22 to the rim portion 26, but preferably the widths of the third portions 42 proximate to the second portion 40 of the upper surface 22 are enlarged such that adjacent third portions 42 contact one another at the connection to the second portion 40.

A plurality of like fourth portions 46 of the upper surface 22 preferably curve and/or angle downwardly and radially outwardly (toward the outer periphery 28), relative to the center C, from the second portion 40 of the upper surface 22 to a lowermost portion 48 of the fourth portions 46. From the lowermost portion 48 of the fourth portions 46, the fourth portions 46 preferably curve upwardly and radially outwardly (toward the outer periphery 28), relative to the center C, to the rim portion 26 of the disc member 20. Each fourth portion 46 is provided between two adjacent third portions 42. As such, each of the fourth portions 46 has a width which is generally continuously enlarged from the connection of the second portion 40 and the two adjacent third portions 42, to the rim portion 26. The lowermost portion 48 of the fourth portions 46 are generally circular and are preferably flat.

Each third portion 42 is provided between two adjacent fourth portions 46. From the connection to one of the fourth portions 46, to the connection of the other one of the adjacent fourth portions 46, each third portion 42 is preferably curved in a convex manner. From the connection of each fourth portion 46 to each third portion 42, the fourth portion 46 is preferably curved in a concave manner to the lowermost portion 48 of the fourth portion 46.

Thus, with this configuration of the third and fourth portions 42, 46 of the disc member 20, the fourth portions 46 act as pockets or individual compartments into which water will be retained, as will be discussed in further detail herein, and the third portions 42 act as separators or barriers to the adjacent pockets or individual compartments into which water will be retained. Each disc member 20 preferably has ten third portions 42 and ten fourth portions 46, such that each disc member 20 generally defines ten separated pockets or individual compartments for retaining water.

The rim portion 26 of the disc member 20 has first and second portions 50, 52 defined thereabout. The first portions 50 of the rim portion 26 appear as extensions of the third portions 42 of the upper surface 22 and the second portions 52 of the rim portion 26 appear as extensions of the fourth portions 46 of the upper surface 22, such that the first and second portions 50, 52 of the rim portion 26 are provided in an alternating manner about the rim portion 26.

Between adjacent second portions 52 of the rim portion 26, each first portion 50 of the rim portion 26 preferably curves in a convex manner such that a middle of each first portion 50 of the rim portion 26 provides the highest most points of the rim portion 26. Between adjacent first portions 50 of the rim portion 26, each second portion 52 of the rim portion 26 preferably curves in a concave manner such that a middle of each second portion 52 of the rim portion 26 provides the lowest most points of the rim portion 26.

Between the lower surface 24 of the disc member 20 and the third portions 42 of the upper surface 22 of the disc member 20, the first portions 50 of the rim portion 26 preferably curve inwardly in a concave manner (toward the center C). Between the lower surface 24 of the disc member 20 and fourth portions 46 of the upper surface 22 of the disc member 20, the second portions 52 of the rim portion 26 preferably curve outwardly in a convex manner (toward the outer periphery 28). Thus, a middle of the first portions 50 of the rim portion 26 are the furthest most points of the rim portion 26 from the outer periphery 28 while the middle of the second portions 52 of the rim portion 26 are the closest most points of the rim portion 26 to the outer periphery 28.

The disc member 20 is configured to be used on a watering line system for providing water to poultry. A part 100 of a watering line system is illustrated in FIGS. 6-9. Part 100 includes a tube member 102, a shield member 104, a pair of watering nipple assemblies 106, which include a pair of the disc members 20 of the present invention, and a dual catch cup assembly 108. Each part 100 of the watering line system is configured to be connected to like parts 100 along the length of the watering line system. Each part 100 need not be connected directly to one another, but may be separated from one another by pieces of the tube member 102 and the shield member 104, each of which are a desired length in order to separate adjacent parts 100 by a desired distance.

The tube member 102 of each part 100 is hollow and is configured to receive water (or other liquids if desired) therein from a source (not shown) which may be directly connected to the tube member 102 of the part 100 or to another one of the tube members 102 provided on another one of the parts 100 making up the watering line system.

The shield member 104 is generally formed in a Y-shaped configuration such that it has first, second and third legs 110, 112, 114. The first leg 110 is positioned generally perpendicular to the floor/ground and is configured to be connected to a winching system (not shown), and the second and third legs 112, 114, which extend below the first leg 110, are configured to be secured to other parts of the watering line system as will be discussed further herein. As such, the winching system can raise and lower the entire watering line system as desired.

Besides the disc member 20, each watering nipple assembly 106 typically includes at least a housing 116 having a restrictor pin 118 extending upwardly therefrom, a trigger pin or stein 120 which extends downwardly therefrom, and a valve assembly (not shown) within the housing 116 between the restrictor and trigger pins 118, 120. Each watering nipple assembly 106 also preferably includes a pair of resilient arms 122, 124 which extend upwardly from the housing 116 on opposite sides of the restrictor pin 118.

The resilient arms 122, 124 are positioned around the exterior of the tube member 102 and function as a saddle to grip the tube member 102 and to hold the watering nipple assembly 106 in its installed position. Flanges 126, 128 extend from arms 122, 124, respectively, in order to secure the watering nipple assembly 106 to the second and third legs 112, 114, respectively, of the shield member 104.

The housing 116 also has a portion (not shown) having a bore (not shown) therethrough which extends through an opening (not shown) of the tube member 102 in order to allow water flowing through the tube member 102 to flow into the bore and, thus, into the housing 116.

The restrictor pin 118 extends through the bore of the portion of the housing 116 and into the tube member 102 with a clearance selected to provide a restricted and regulated flow of water into the housing 116.

As best illustrated in FIGS. 6, 7, 9 and 11, the trigger pin 120 has an enlarged head portion 129 which is positioned within the housing 116 and an elongated pin portion 130 which extends from the enlarged head portion 129 and out of the housing 116. The housing 116 is configured such that the pin portion 130 can be moved. Movement of the pin portion 130 causes movement of the head portion. Movement of the head portion causes movement of the valve assembly within the housing 116 such that the valve assembly permits water within the housing 116, which has entered the housing 116 through the bore in which the restrictor pin 118 is provided, to flow around the valve assembly and out of the lower part of the housing 116, generally down the side of the pin portion 130 or alongside the side of the pin portion 130.

The pin portion 130 has first, second and third portions 131, 132, 133. The first portion 131 extends downwardly from the enlarged head portion 129 and is generally cylindrical in configuration and preferably has a diameter which is generally equal to or slightly less than the diameter of the second portion 35 of the aperture 32 of the disc member 20. The second portion 132 extends downwardly from the first portion 131 and is generally cylindrical in configuration and preferably has a diameter which is generally equal to or slightly less than the diameter of the fourth portion 37 of the aperture 32 of the disc member 20, such that a shoulder 134 is provided between the first and second portions 131, 132. The third portion 133 extends downwardly from the second portion 132 and is generally formed in the shape of a cone. The third portion 133 has a diameter that is larger than the diameter of the second portion 132 and which is approximately equal to the diameter of the first portion 131 such that a shoulder 135 is provided between the second and third portions 132, 133. The pin portion 130 is configured to be snap-fit into the aperture 32 of the disc member 20 with the shoulder 135 being positioned against the flat horizontal surface of the lower surface 24 of the disc member 20, with the second portion 132 being positioned within the fourth portion 37 of the aperture 32 of the disc member 20, and with the first portion 131 being positioned within the second portion 35 of the aperture 32 of the disc member 20. The snap-fit of the trigger pin 120 to the disc member 20 has a high holding strength because in order for the disc member 20 to be removed from the trigger pin 120, a portion of the disc member 20 must be sheared or cut out of the way by the trigger pin 120 itself. It is to be understood that the disc member 20 could be secured to the trigger pin 120 by other means as well.

It should be understood that many types of watering nipple assemblies 106, other than that as generally described herein, could be utilized in order to secure the disc member 20 to a portion thereof.

The dual catch cup assembly 108 has a support member 136 which is secured to the tube member 102 between the two watering nipple assemblies 106. The support member 136 has a pair of resilient arms 138 at a top thereof which are positioned around the exterior of the tube member 102 and function as a saddle to grip the tube member 102 and to hold the dual catch cup assembly 108 in its installed position. Flanges (not shown) extend from arms 138 in order to secure the dual catch cup assembly 108 to the second and third legs 112, 114, respectively, of the shield member 104. Below the arms 138, an optional flange 140 may extend along the bottom of the tube member 102 to be secured to the housing 116 of one of the watering nipple assemblies 106.

Below the arms 138, the support member 136 has first and second legs 142, 144 extending downwardly such that the support member 136 is generally formed in an upside-down V-shape. A first catch cup 146 extends from the first leg 142 and is positioned tinder one of the disc members 20 at a predetermined distance, preferably approximately 1.5 inches. The first catch cup 146 has an outer diameter which is preferably larger than the diameter of the outer periphery 28 of the disc member 20. Likewise, a second catch cup 148 extends from the second leg 144 and is positioned under the other one of the disc members 20 at a predetermined distance, preferably approximately 1.5 inches. The second catch cup 148 preferably has an outer diameter which is generally identical to the outer diameter of the first catch cup 146.

Operation of the watering line system with the disc members 20 will now be discussed. With water flowing through the tube member 102, the disc members 20 are positioned at a desired height above the floor/ground on which the poultry are moving around. Thus, the positioning of the tube member 102 and the first and second catch cups 146, 148 relative to the floor/ground is determined based on the positioning of the disc members 20. Of course, the winching system can be manipulated to move each of these items of the watering line system as desired. The desired height above the floor/ground at which the disc members are positioned is preferably at or about a height of the necks and/or heads of the poultry when the poultry are standing.

Figure 10:
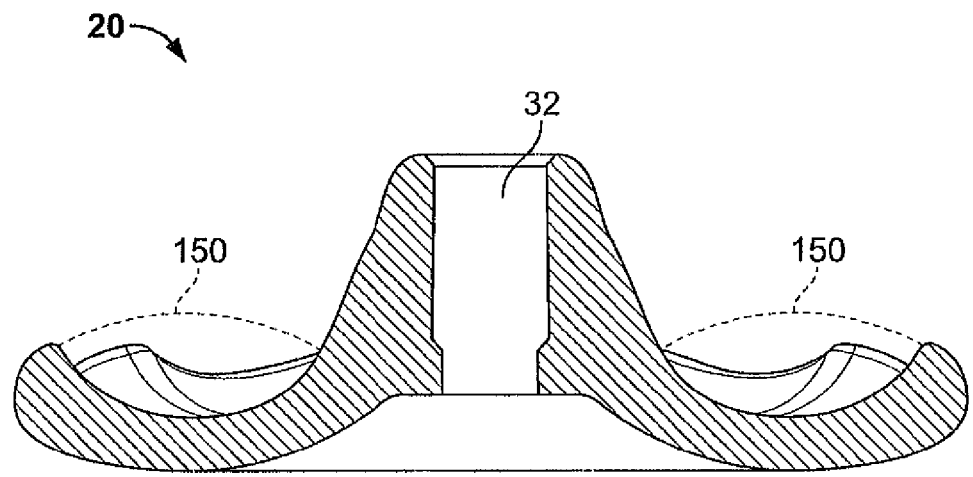
FIG. 10 is identical to FIG. 4, but illustrates water beading up on the watering disc.
Figure 11:
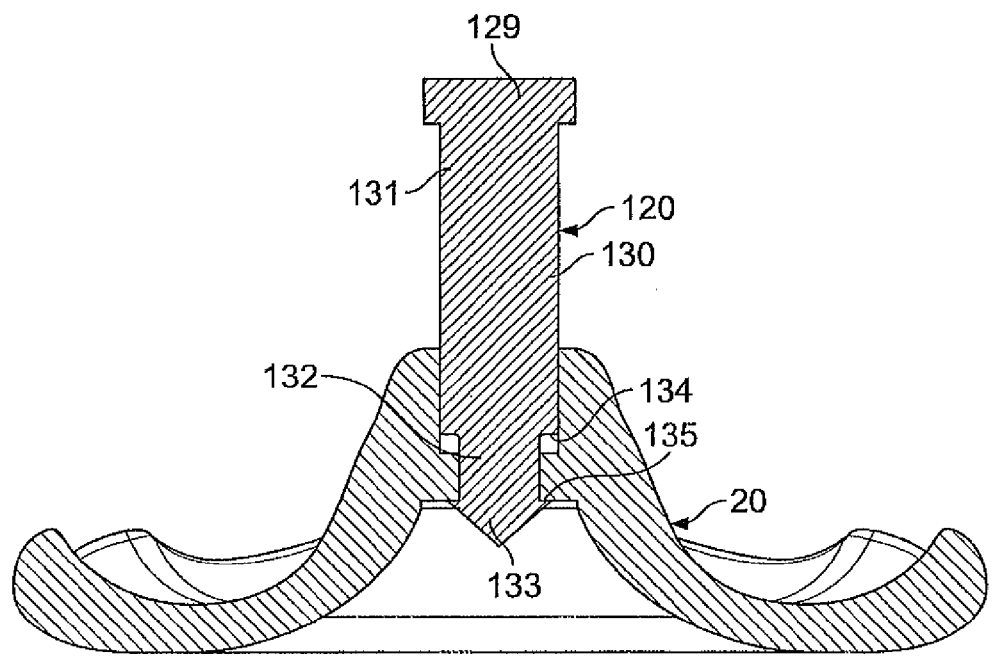
FIG. 11 is a cross-sectional view of the watering disc illustrating the trigger pin snap fit thereto.

The poultry can obtain water from the watering line system in a number of different ways. Preferably, the birds can obtain water by leaning their heads or beaks against the rim portion 26 of the disc member 20 (as well as the surrounding tipper and lower surfaces 22, 24 of the disc member 20), such that the birds will push the disc member 20 away from their necks. The poultry could also peck at the disc members 20 or grasp the disc members 20 with their beaks. Movement of the disc member 20 in these manners causes the trigger pin 120 to be moved, thus moving the valve assembly, such that water within the housing 116 is allowed to flow around the valve assembly and down the pin portion 130 of the trigger pin 120, as well as alongside the pin portion 130 of the trigger pin 120. This water then flows down the first and second portions 38, 40 of the upper surface 22 of the disc member 20 and into the pockets or individual compartments defined by the third and fourth portions 42, 46 of the upper surface 22 of the disc member 20. The water will tend to bead up in the pockets, as illustrated by dotted line 150 in FIG. 10, generally because of the increased surface tension provided by the configuration of the upper surface 22. Because of the curved/angled configurations of the first, second and third portions 38, 40, 42 of the upper surface 22, any water provided thereon will tend to flow into the pockets defined by the fourth portions 46 of the disc member 20. When the water is flowing into the disc member 20, the birds will tend to stop pushing on the disc member 20 such that water flow to the disc member 20 is stopped as the valve assembly in the housing 116 prevents further flow of water.

With the water in the pockets of the disc member 20, the birds are free to drink the water that has accumulated therein and, because of the individual pockets/compartments, each bird at the disc member 20 will have its own pocket to drink water from. Thus, when drinking, the bird will tend to receive water from only the pocket it is drinking from, which will substantially reduce the wetting of the poultry that can result if more water is provided to the bird than the bird is capable of consuming. The beading of the water in the pockets will also tend to attract other birds to the disc member 20 to drink therefrom as the beaded water 150 will generally be visible over even the highest most points of the rim portion 26 of the disc member 20. The configuration of the upper surface 22 of the disc member 20 also tends to prevent splashing of water into the faces of the birds, thereby reducing the possibility that birds will develop an aversion to the watering device.

Also, when the bird moves the disc member 20, the disc member 20 will tilt in the direction of the bird. As this occurs, the water on the disc member 20 runs across the upper surface 22 thereof and toward, and generally into, the bird's mouth. When this happens, the rim portion 26 tends to prevent water on the opposite side of the disc member 20 from flowing/flying off of the back side of the disc member 20.

While the water is flowing into the disc member 20 and while the birds are drinking the water from the pockets, some water will invariably be moved over the rim portion 26 of the disc member 20 such that it will fall out of the disc member 20. In these instances, the first and second catch cups 146, 148 are positioned to catch therein most of the water which is not retained by the disc members 20, and preventing the water from falling or being spilled onto the floor/ground. The poultry may then drink the water that is accumulated in the first and second catch cups 146, 148 as well.

With the rim portion 26 (as well as the surrounding upper and lower surfaces 22, 24) having a number of curved surfaces, the rim portion 26 also provides smooth surfaces for the birds to hit their necks and/or heads and/or bodies against. With no hard edges, the birds are more likely to find hitting the disc members 20 to obtain water a comfortable experience and one which they will not shy away from because of possible hard edges which could hurt them. The second portions 52 of the rim portion 26 are further configured to be lower than the first portions 50 of the rim portion 26, and are curved in a concave manner, in order to provide a smooth place for the birds to rest their necks, as well as other proximate body parts against, while drinking from the water retained in the pockets of the disc member 20.

With the configuration of the disc members 20 and the provision of the first and second catch cups 146, 148, water is generally substantially inhibited from falling/spilling/splashing onto the floor/ground of the poultry house, thus keeping the floor/ground drier.

The disc member 20 thus provides a number of advantages over prior art poultry watering systems, including bell drinkers and other disc members. Water is only released into the disc members 20 when the birds drink, compared to bell drinkers. As a result, the water stays fresh and clean. Increased surface tension on the curved upper surface 22 of the disc member 20 also inhibits water from being spilled out of the disc members 20. If water is spilled out of the disc members 20, the water is likely to be caught and retained by one of the first and second catch cups 146, 148, such that the birds can drink this water as well, which again stays generally fresh and clean. Thus, only a limited amount of water is spilled/splashed out of both the disc members 20 and the first and second catch cups 146, 148, and onto the floor/ground, such that the floor/ground of the poultry house remains relatively dry, thus reducing the amount of ammonia which is released. All of the foregoing promotes stronger and more disease resistant birds.

The disc members 20 and the dual catch cup assemblies 108 are preferably formed, at least in part, of a non-reflecting, lightweight, inert, tough material such as plastic. However, the disc members 20 and the dual catch cup assemblies 108 can also be formed of any other type of material that is desired, and that may be necessary depending on the type of animal that will be drinking from the watering line system.

Figure 12:
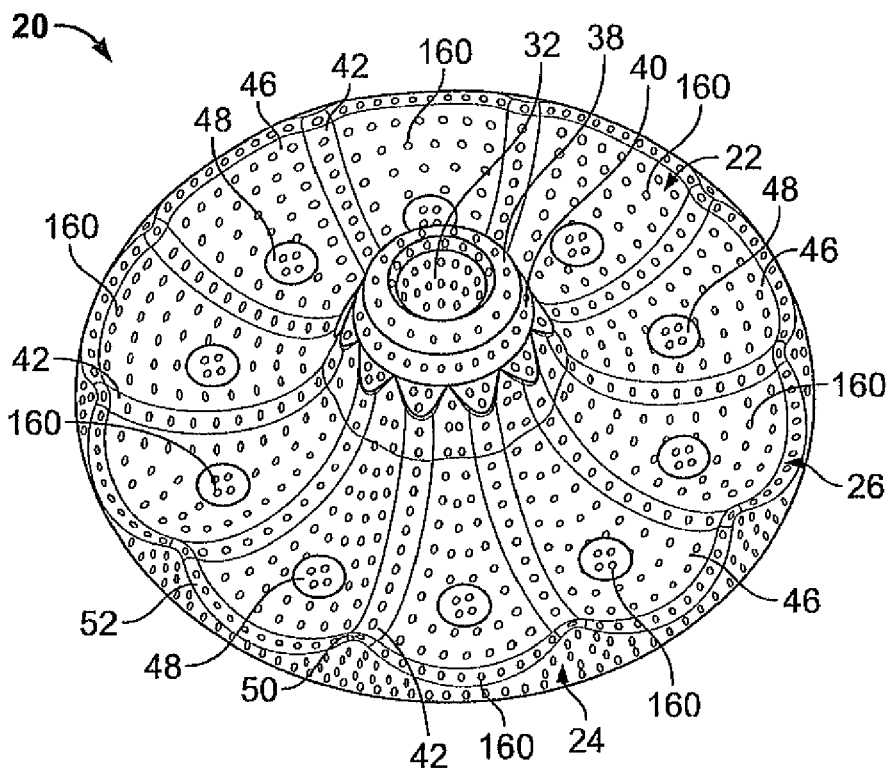
FIG. 12 is a perspective view of the watering disc of the invention having a plurality of reflective particles integrally formed therein.
Figure 13:
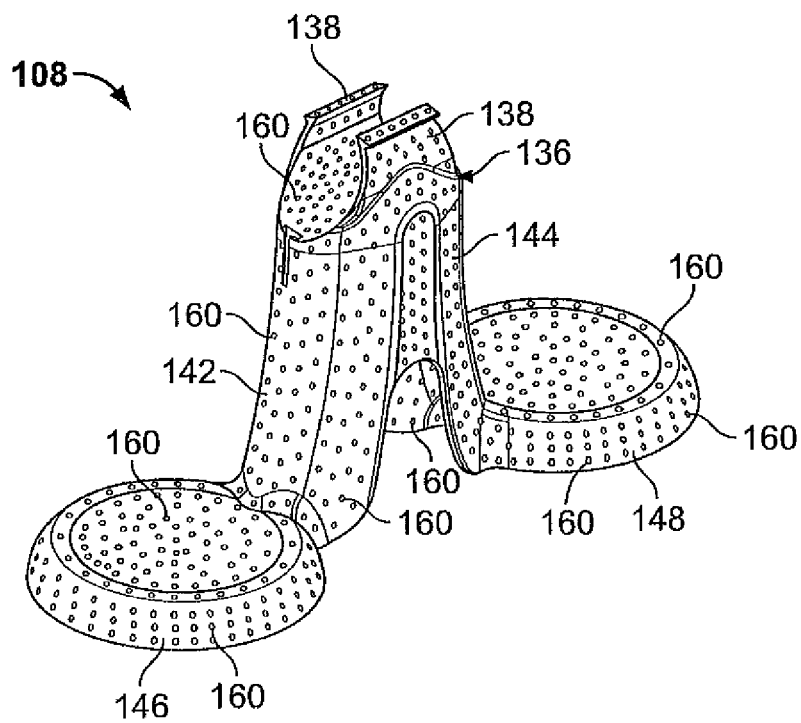
FIG. 13 is a perspective view of the dual catch cup assembly of the invention having a plurality of reflective particles integrally formed therein.

As best illustrated in FIGS. 12 and 13, the disc members 20 and the dual catch cup assemblies 108 are also preferably integrally formed, at least in part, with a plurality of reflective particles 160. The particles 160 are preferably visible from almost any viewpoint and are preferably disposed at random throughout the disc members 20 and the dual catch cup assemblies 108 (FIGS. 12 and 13 illustrate one of basically an infinite number of random dispersements of the particles 160 through the disc members 20 and the dual catch cup assemblies 108), although, it is envisioned that patterns or certain locations of particles could be formed if desired. The particles 160 allow reflection from lighting within the poultry house, or natural light, which is noticed by the poultry. The poultry will then be drawn or attracted to the reflecting particles 160 and, thus, to the disc members 20 and the dual catch cup assemblies 108. Because the poultry are then attracted to the disc members 20 and the dual catch cup assemblies 108, the poultry will be able to find and drink water therefrom. The reflective particles 160 are preferably metallic flecks or flakes, such as titanium or aluminum, or any other metallic or non-metallic material that will bond with the non-reflective material of the disc members 20 and the dual catch cup assemblies 108. The reflective particles 160 preferably have a size range of 35 to 40 thousandths of an inch in diameter, however, the exact size of the reflective particles 160 is not important so long as they are visible to the poultry, distinguishable from the plastic, and have the capability of attracting the poultry to the disc members 20 and the dual catch cup assembly 108.

Parts of the nipple assemblies 106 other than the disc members 20 are also typically formed of a plastic material, for instance the housing 116 and the resilient arms 122, 124, and, as such, could also have the reflective particles 160 formed integrally therewith. Likewise, while it is presently preferred that the trigger pin 120 of the watering nipple assembly 106, as well as the tube member 102 and the shield member 104, are not formed from a plastic material, it is envisioned that the reflective particles 160 could be integrally formed in these parts should one or more of them be formed of a plastic-like material.

While preferred embodiments of the invention are shown and described, it is envisioned that those skilled in the art may devise various modifications without departing from the spirit and scope of the foregoing description and the attached drawings.

The invention is claimed as follows:

1. A watering disc for use in a watering line system, said watering disc comprising:
    an outer top edge; and
    an upper surface extending inwardly from said outer to defining a plurality of separators and a plurality of individual compartments in an alternating manner about a circumference of said watering disc, said plurality of separators generally extending from proximate a center portion of said watering disc to said outer top edge in order to define each said individual compartment bordered between said outer top edge and two adjacent separators, each said individual compartment being formed in a substantially concave manner, said individual compartments configured to receive and retain water from the watering line system, and said center portion configured to engage a trigger pin,
    wherein said outer top edge curves upwardly and downwardly in an alternating convex and concave manner, said outer top edge curves in a convex manner along each of said separators, said outer top edge curves in a concave manner along each of said individual compartments.

2. The watering disc as defined in claim 1, wherein ten individual compartments for receiving and retaining water are defined by said upper surface.

3. The watering disc as defined in claim 1, wherein interior and exterior sides of said outer top edge curve inwardly and outwardly relative to said center portion in an alternating convex and concave manner.

4. The watering disc as defined in claim 1, wherein each said individual compartment has a lowermost portion which is generally flat, each said individual compartment is further curved upwardly in a concave manner from said lowermost portion to said outer top edge and said two separators defining said individual compartment.

5. The watering disc as defined in claim 1, wherein said separators are curved in a convex manner from a connection to one of said individual compartments to the connection of an adjacent individual compartment.

6. The watering disc as defined in claim 1, wherein said individual compartments, said separators and said outer top edge are configured in a manner to have water retained within said individual compartments bead tip higher than said outer top edge such that said beaded up water is visible over said outer top edge, said configuration of said individual compartments, said separators and said outer top edge further making it is possible that said visible beaded up water retained in one of said individual compartments does not come into contact with said visible beaded up water retained in an adjacent individual compartment.

7. The watering disc as defined in claim 1, wherein said center portion defines the means for allowing said watering disc to be secured to said trigger pin of a nipple assembly.

8. The watering disc as defined in claim 1, wherein said outer top edge and said upper surface do not have any hard edges.

9. The watering disc as defined in claim 1, wherein said watering disc is at least partially formed of a non-reflective material, and wherein a plurality of reflective particles are integrally formed within said non-reflective material, whereby said reflective particles function to attract poultry to said watering disc to facilitate drinking behavior.

10. A nipple assembly for receiving water from a tube member in a watering line system and for providing the received water to poultry, said nipple assembly comprising:
    a housing which is configured to receive water from the tube member;
    a valve assembly provided within said housing;
    a trigger pin which is partially positioned within said housing and which is partially extended out of said housing; and
    a disc member which is secured to said trigger in outside of said housing, said disc member having a plurality individual compartments which are each formed in a substantially concave manner;
    whereby movement of said disc member or said trigger pin causes said trigger pin to actuate said valve assembly within said housing such that water within said housing flows around said valve assembly, out of said housing, and into said individual compartments of said disc member to be retained therein,
    wherein said disc member further comprises a rim portion and a plurality of separators generally extending from proximate a center of said disc member to said rim portion such that said plurality of individual compartments are bordered between said separators and said rim portion,
    wherein said rim portion curves upwardly and downwardly in an alternating convex and concave manner, said rim portion curves in a convex manner along each of said separators, said rim portion curves in a concave manner along each of said individual compartments.

11. The nipple assembly as defined in claim 10, wherein an outer periphery of said disc member is in a circular configuration.

12. The nipple assembly as defined in claim 10, wherein said disc member has ten individual compartments for retaining water.

13. The nipple assembly as defined in claim 10, wherein interior and exterior sides of said rim portion curve inwardly and outwardly relative to said center in an alternating convex and concave manner.

14. The nipple assembly as defined in claim 10, wherein each said individual compartment has a lowermost portion which is generally flat, each said individual compartment is further curved upwardly in a concave manner from said lowermost portion to said run portion and said two separators defining said individual compartment.

15. The nipple assembly as defined in claim 10, wherein said separators are curved in a convex manner from a connection to one of the individual compartments to the connection of an adjacent individual compartment.

16. The nipple assembly as defined in claim 10, wherein said individual compartments, said separators and said rim portion are configured in a manner to have water retained within said individual compartments bead up higher than said rim portion such that said beaded up water is visible over said rim portion, said configuration of said individual compartments, said separators and said outer top edge further making it is possible that said visible beaded up water retained in one of said individual compartments does not come into contact with said visible beaded up water retained in an adjacent individual compartment.

17. The nipple assembly as defined in claim 10, wherein said disc member has an aperture which extends through said center thereof, said trigger pin being secured to said disc member through said aperture by a snap fit connection.

18. The nipple assembly as defined in claim 10, wherein said disc member has only smooth outward surfaces for poultry to hit against in order to receive water from the nipple assembly.

19. The nipple assembly as defined in claim 10, wherein said disc member is at least partially formed of a non-reflective material, and wherein a plurality of reflective particles are integrally formed within said non-reflective material, whereby said reflective particles function to attract poultry to said nipple assembly to facilitate drinking behavior.

20. A watering line assembly for providing water to poultry, said watering line assembly comprising:

tube means for delivering the water from a source;

at least one nipple assembly having a housing configured to receive water from said tube means, a valve assembly provided within said housing, a trigger pin which is partially positioned within said housing and which is partially extended out of said housing, and a disc member which is secured to said trigger pin outside of said housing, said disc member having a plurality of individual compartments which are each formed in a substantially concave manner; and a catch cup assembly having at least one catch cup and means for positioning said at least one catch cup below said at least one nipple assembly, whereby movement of said disc member or said trigger pin causes said trigger pin to actuate said valve assembly such that water within said housing flows around said valve assembly, out of said housing, and into said individual compartments of said disc member to be retained therein, said catch cup assembly configured to receive and retain water that flowed out of said housing but that was not retained in said individual compartments of said disc member, wherein said disc member further comprises a rim portion and a plurality of separators generally extending from proximate a center of said disc member to said rim portion such that said plurality of individual compartments are bordered between said separators and said rim portion, wherein said rim portion curves upwardly and downwardly in an alternating convex and concave manner, said rim portion curves in a convex manner along each of said separators, said rim portion curves in a concave manner along each of said individual compartments.

21. The watering line system as defined in claim 20, wherein first and second nipple assemblies are provided, and wherein said catch cup assembly has first and second catch cups, said first catch cup being positioned below said first nipple assembly, said second catch cup being positioned below said second nipple assembly.

22. The watering line system as defined in claim 20, wherein said disc member is at least partially formed of a non-reflective material, and wherein a plurality of reflective particles are integrally formed within said non-reflective material, whereby said reflective particles function to attract poultry to mid at least one nipple assembly to facilitate drinking behavior.

23. The watering line assembly defined in claim 20, wherein said at least one catch cup assembly is at least partially formed of a non-reflective material, and wherein a plurality of reflective particles are integrally formed within said non-reflective material, whereby said reflective particles function to attract poultry to said at lost one catch cup assembly to facilitate drinking behavior.

* * * * *

UNITED STATES PATENT AND TRADEMARK OFFICE
CERTIFICATE OF CORRECTION

| | | |
|---|---|---|
| PATENT NO. | : 7,681,526 B2 | Page 1 of 1 |
| APPLICATION NO. | : 11/779672 | |
| DATED | : March 23, 2010 | |
| INVENTOR(S) | : Christopher Richard Roes | |

It is certified that error appears in the above-identified patent and that said Letters Patent is hereby corrected as shown below:

Column 11, Line 32 "said outer to" should read
-- said outer top edge --

Column 12, Line 4 "bead tip higher" should read
-- bead up higher --

Column 13, Line 1 "to said run portion" should read
-- to said rim portion --

Signed and Sealed this

Fifth Day of October, 2010

David J. Kappos
*Director of the United States Patent and Trademark Office*